United States Patent [19]

Pratt et al.

[11] 4,410,916
[45] Oct. 18, 1983

[54] DUAL MODE FACSIMILE CODING SYSTEM AND METHOD

[75] Inventors: William K. Pratt, San Jose; Ronald S. Bader, Cupertino; Wen-Hsiung Chen, Sunnyvale; Lyle V. Rennick, Cupertino; Robert H. Wallis, Portola Valley, all of Calif.

[73] Assignee: Compression Labs, Inc., Cupertino, Calif.

[21] Appl. No.: 281,721

[22] Filed: Jul. 9, 1981

Related U.S. Application Data

[63] Continuation of Ser. No. 69,551, Aug. 24, 1979, Pat. No. 4,288,782.

[51] Int. Cl.³ .............................................. H04N 1/40
[52] U.S. Cl. ..................................... 358/263; 358/261; 382/41
[58] Field of Search ............... 358/263, 256, 260, 261; 382/41

[56] References Cited

U.S. PATENT DOCUMENTS

| | | | |
|---|---|---|---|
| 3,743,765 | 7/1973 | Maier | 358/260 |
| 3,980,809 | 9/1976 | Cook | 358/261 |
| 3,995,106 | 11/1976 | Wern | 358/263 |
| 4,091,424 | 5/1978 | Widergren | 358/261 |
| 4,149,145 | 4/1979 | Hartke | 358/263 |
| 4,151,562 | 4/1979 | Tregay | 358/263 |
| 4,180,798 | 12/1979 | Komori | 358/263 |
| 4,288,782 | 9/1981 | Bader | 382/34 |

OTHER PUBLICATIONS

Arps, R. B., "Binary Image Compression," in *Image Transmission Techniques*, W. K. Pratt, Ed., Academic Press, New York, 1979.

Musmann, H. G. and D. Preuss, "Comparison of Redundancy Reducing Codes for Facsimile Transmission of Documents," *IEEE Transactions on Communications*, vol. CCM-25, No. 11, Nov. 1977, pp. 1425-1433.

Ascher, R. N., and G. Nagy, "A Means for Achieving a High Degree of Compaction on Scan-Digitized Text," *IEEE Transactions on Computers*, vol. C-23, No. 11, Nov., 1974, pp. 1174-1179.

Pratt, W. K., W. Chen and C. Reader, "Block Character Coding," *Proceedings SPIE*, Aug. 1976, pp. 222-228.

Chen, W., J. L. Douglas and R. D. Widergren, "Combined Symbol Matching-A New Approach to Facsimile Data Compression," *Proceedings SPIE*, Aug., 1978.

Yamakazi, Y., Y. Wakahara, and H. Teramura, "Interline Coding of Digital Facsimile Signals," *Picture Coding Symposium*, Tokyo, Japan, Aug. 1977, pp. 37-38.

"Proposal for Draft Recommendation of Two-Dimensional Coding Scheme," *Report of Study Group XIV*, Contribution No. 42.

Preuss, D., *IEEE International Conference on Communications*, 1975, pp. 7.12-7.16.

*Primary Examiner*—Howard Britton
*Attorney, Agent, or Firm*—Flehr, Hohbach, Test, Albritton & Herbert

[57] ABSTRACT

A dual mode facsimile data compression technique which possesses the advantage of symbol recognition and extended run-length coding methods. In operation, a symbol blocking operator isolates digital raster data representing valid alphanumeric characters and document symbols. The first symbol encourgered is placed in a memory or library and as each new symbol is detected, it is compared with each entry of the library. If the comparison is within a predetermined tolerance, a library identification code representing the symbol is generated and transmitted along with the symbol location coordinates. Otherwise, the new symbol is placed in the library and its digital pattern and location is transmitted. A scoring system determines which elements of the library are to be replaced by new prototypes once the library is filled. Non-isolated symbols are coded by a two-dimensional run-length coding method for transmission.

34 Claims, 14 Drawing Figures

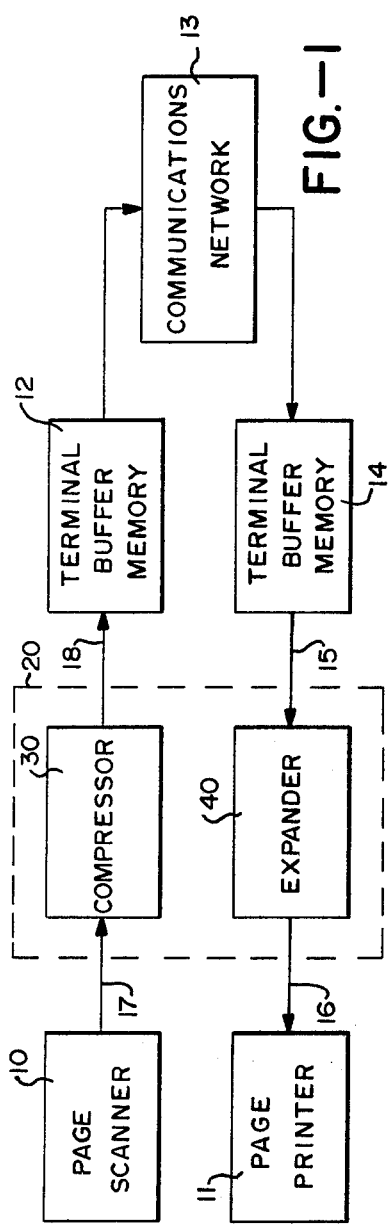
FIG.—1
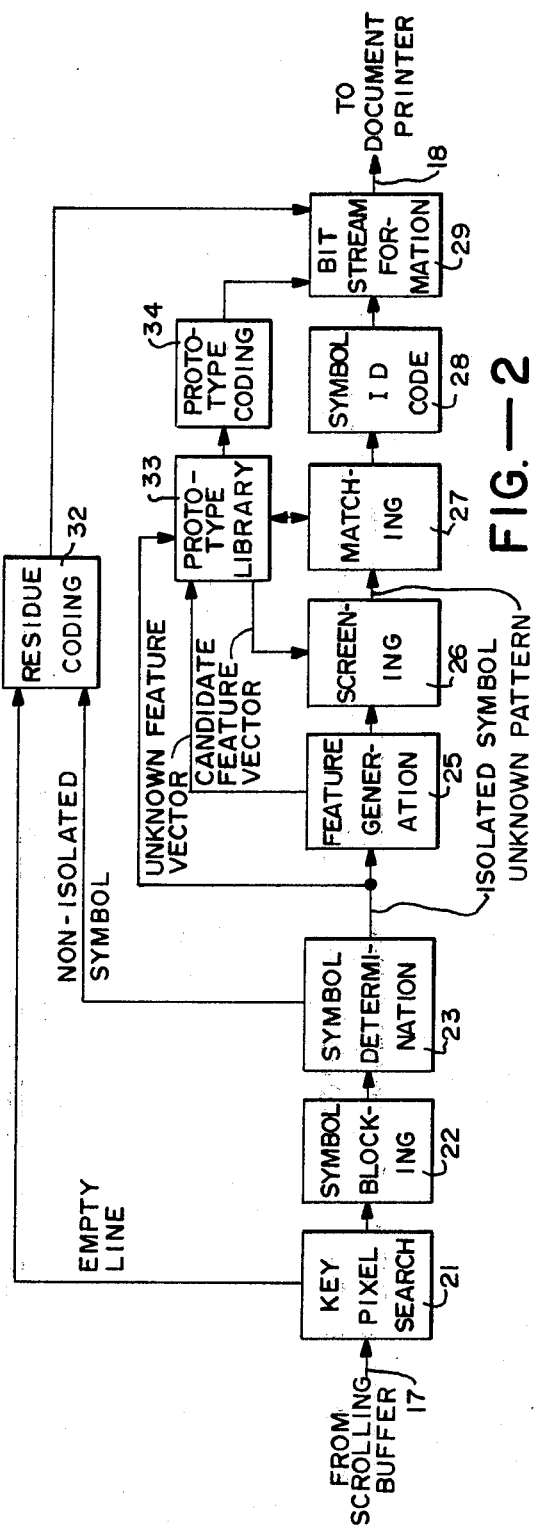
FIG.—2

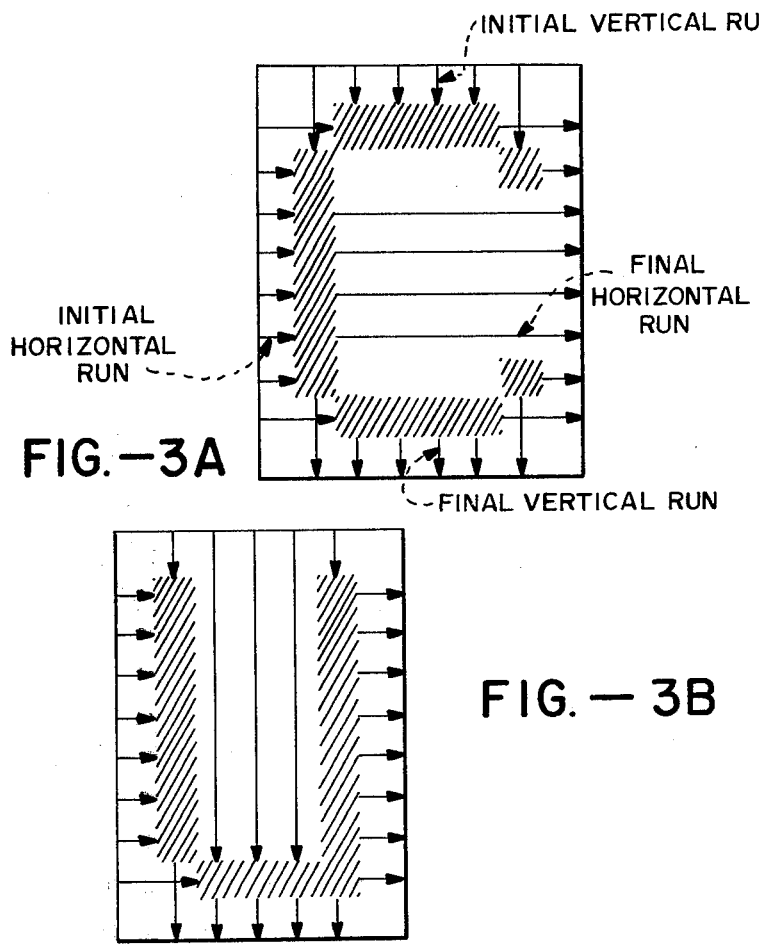
FIG.—3A
FIG.—3B
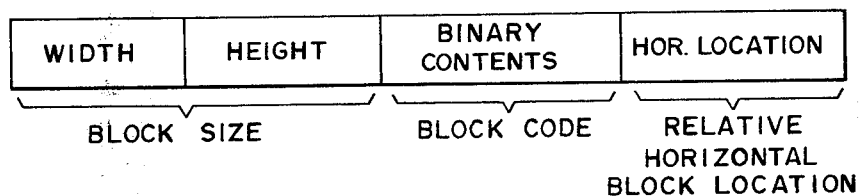
(a) PROTOTYPE CODE
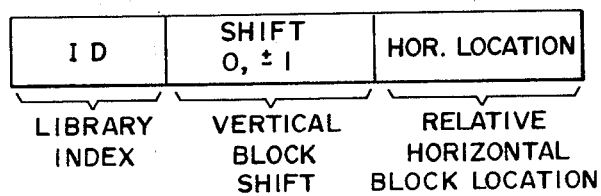
(b) MATCHED SYMBOL CODE
FIG.—4

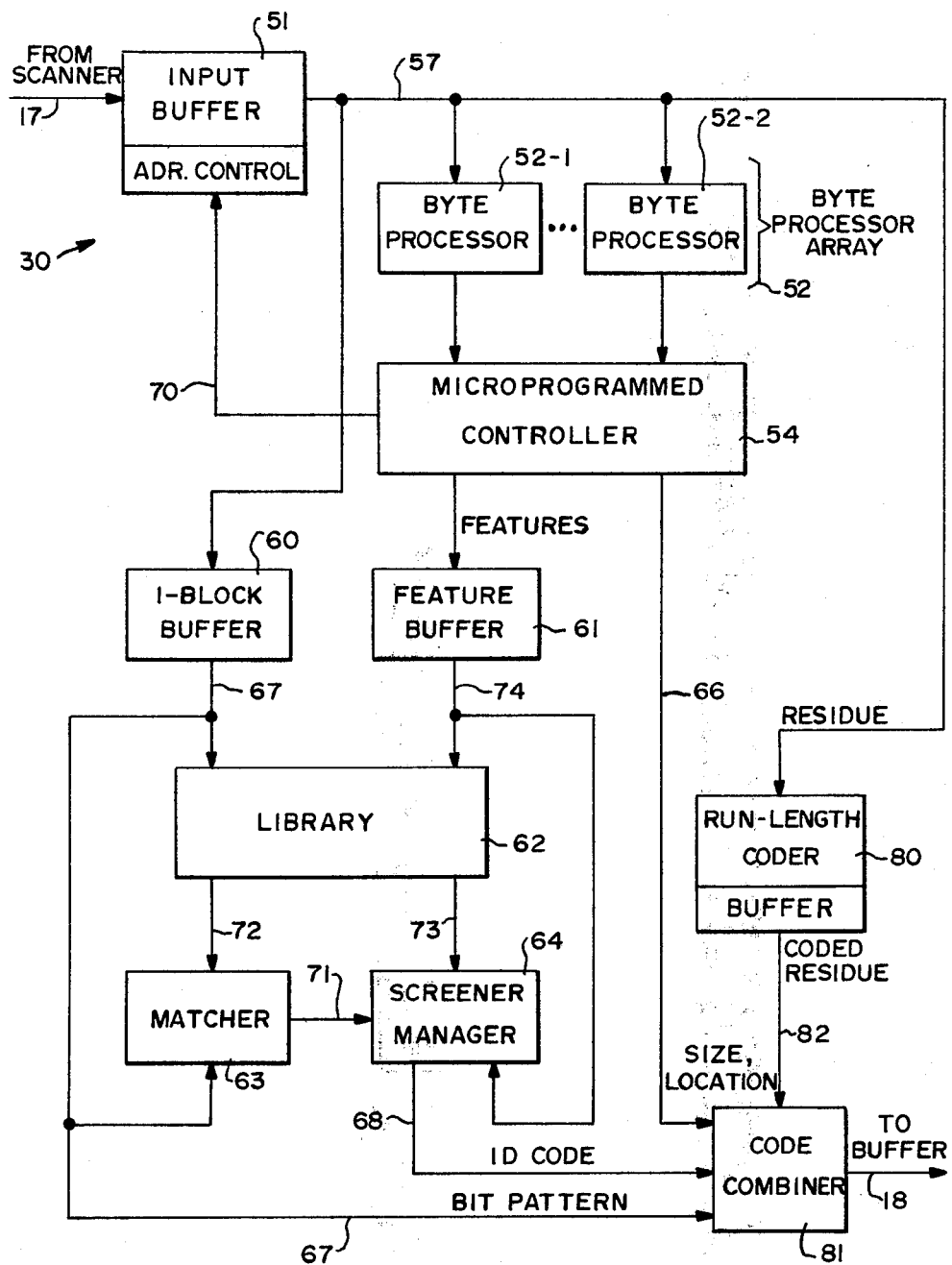
FIG. — 5

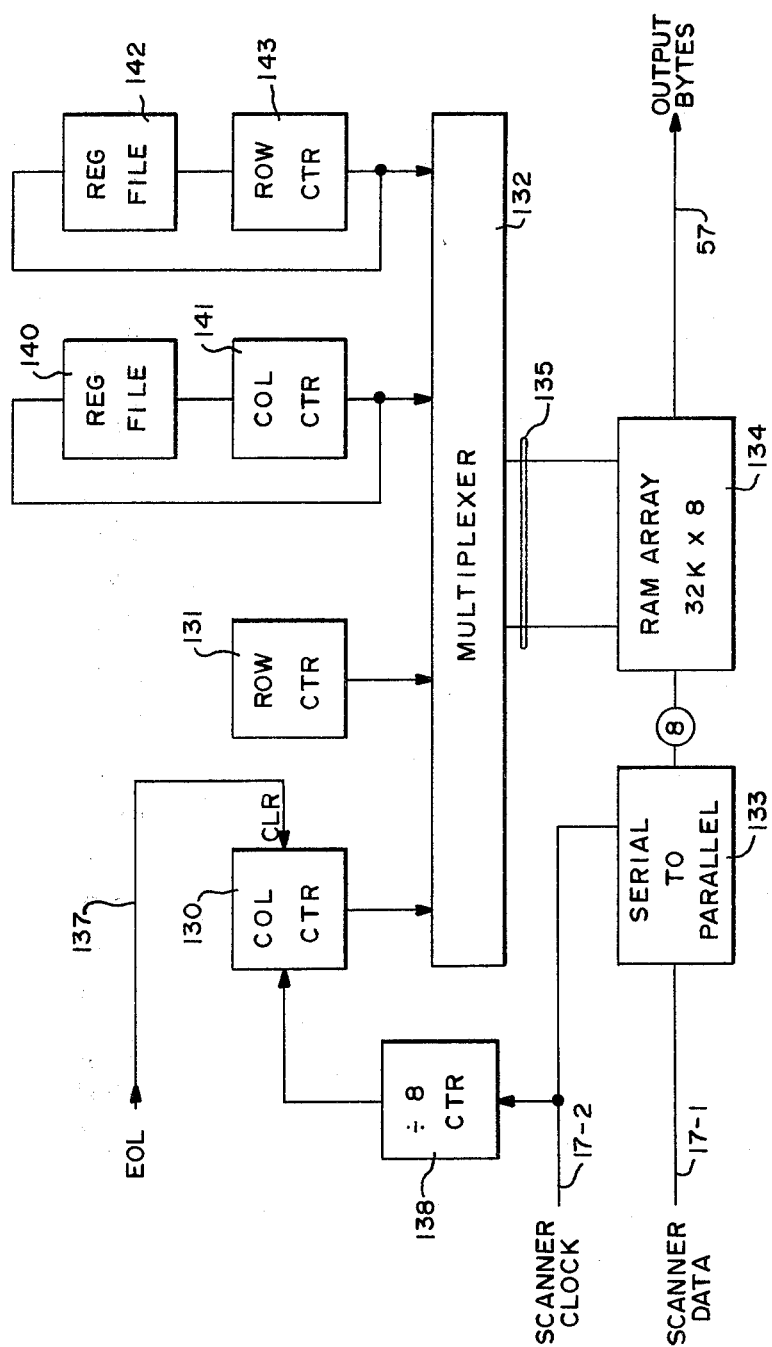
FIG.—6

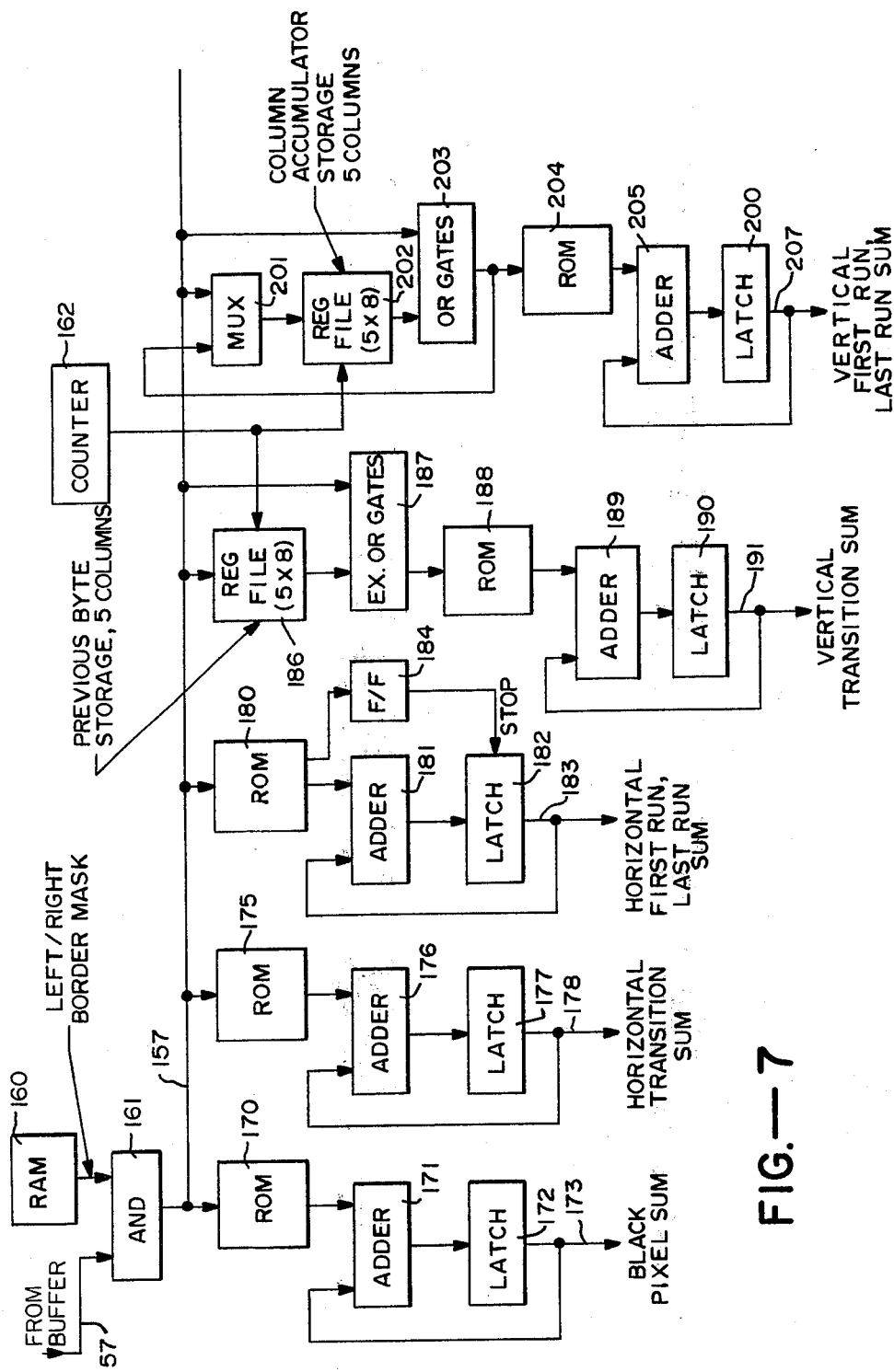
FIG.—7

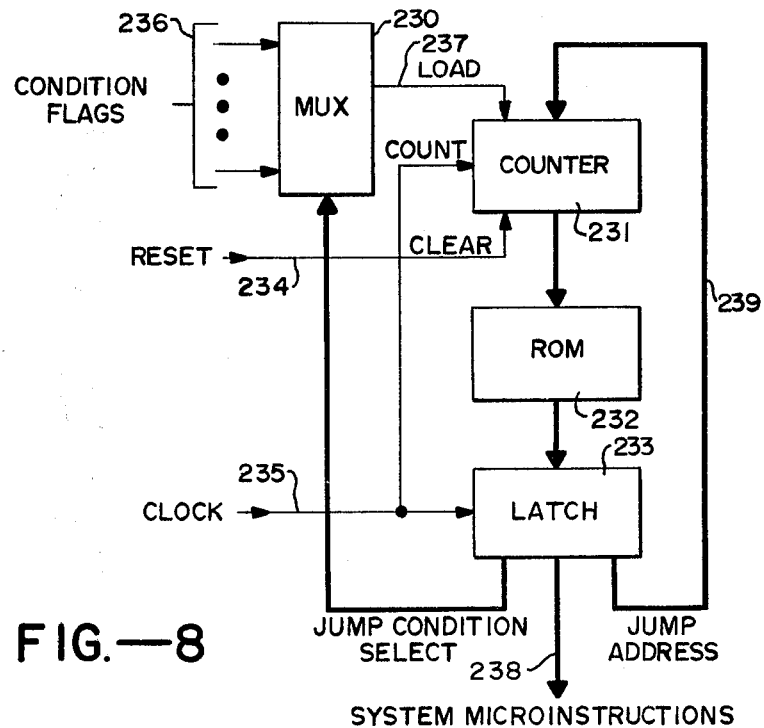
FIG.—8
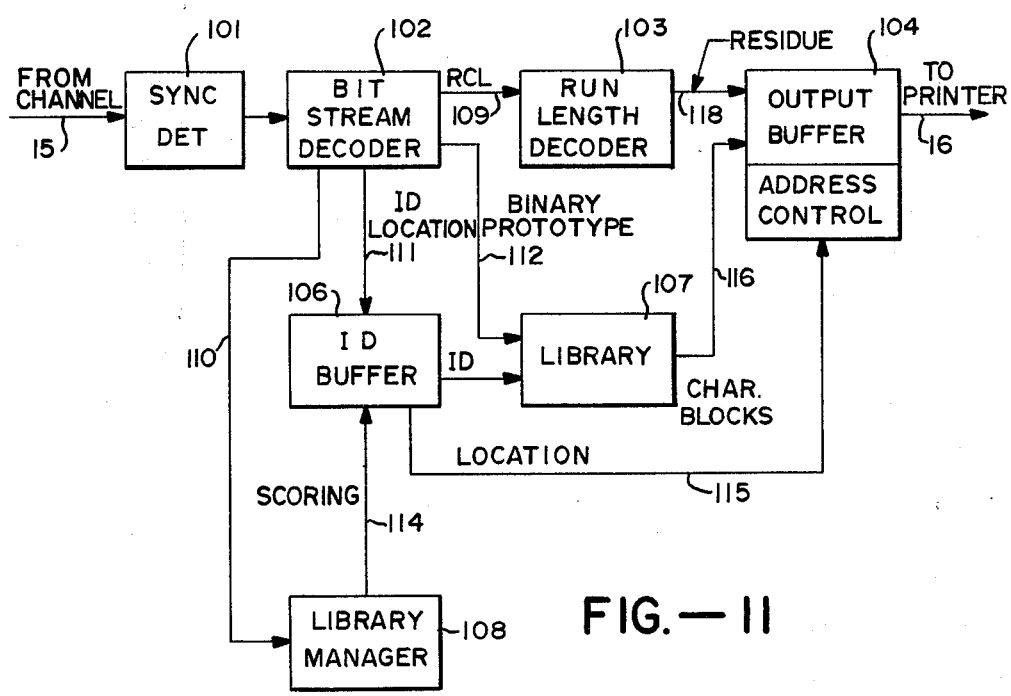
FIG.—11

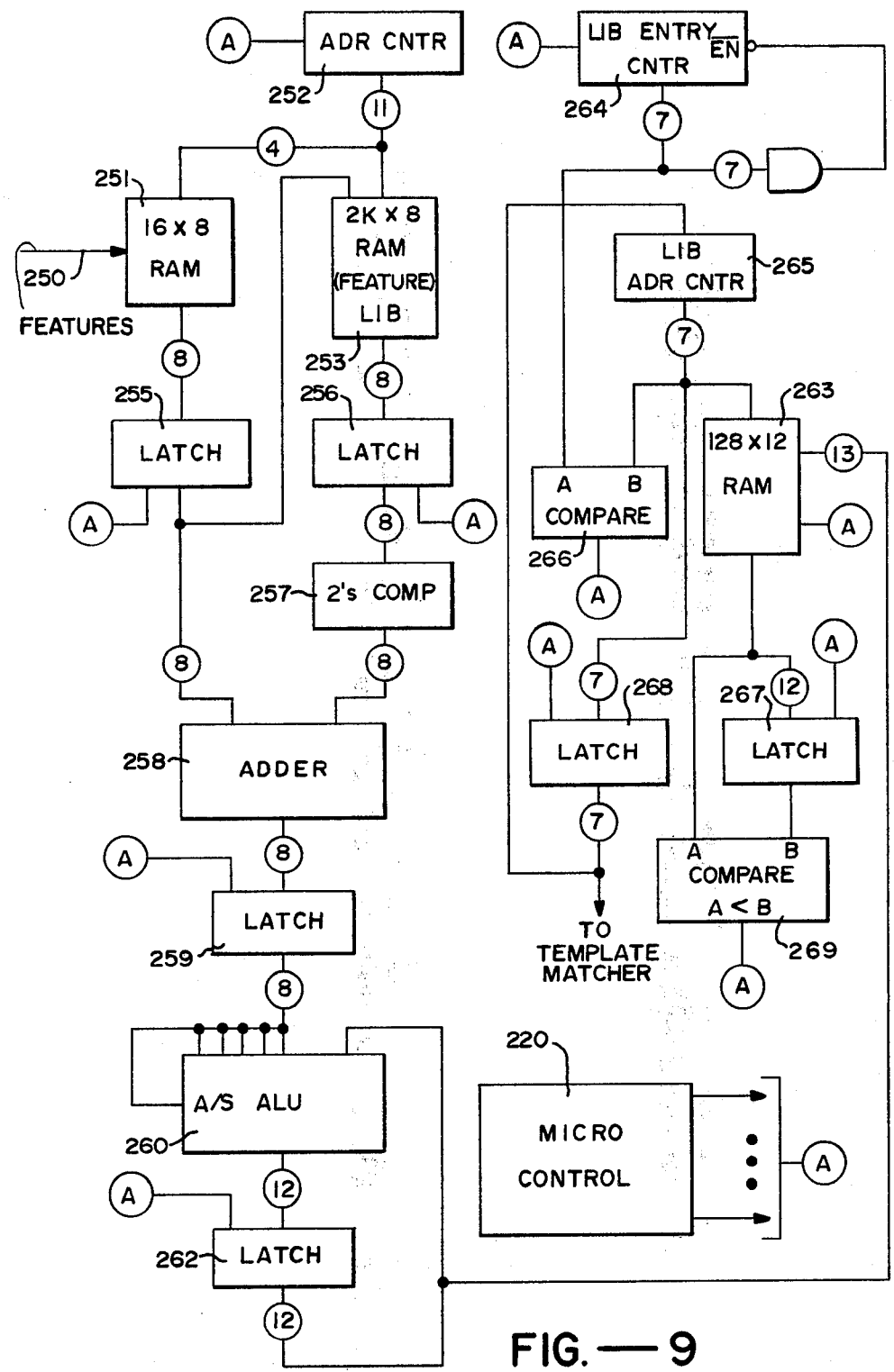
FIG.—9

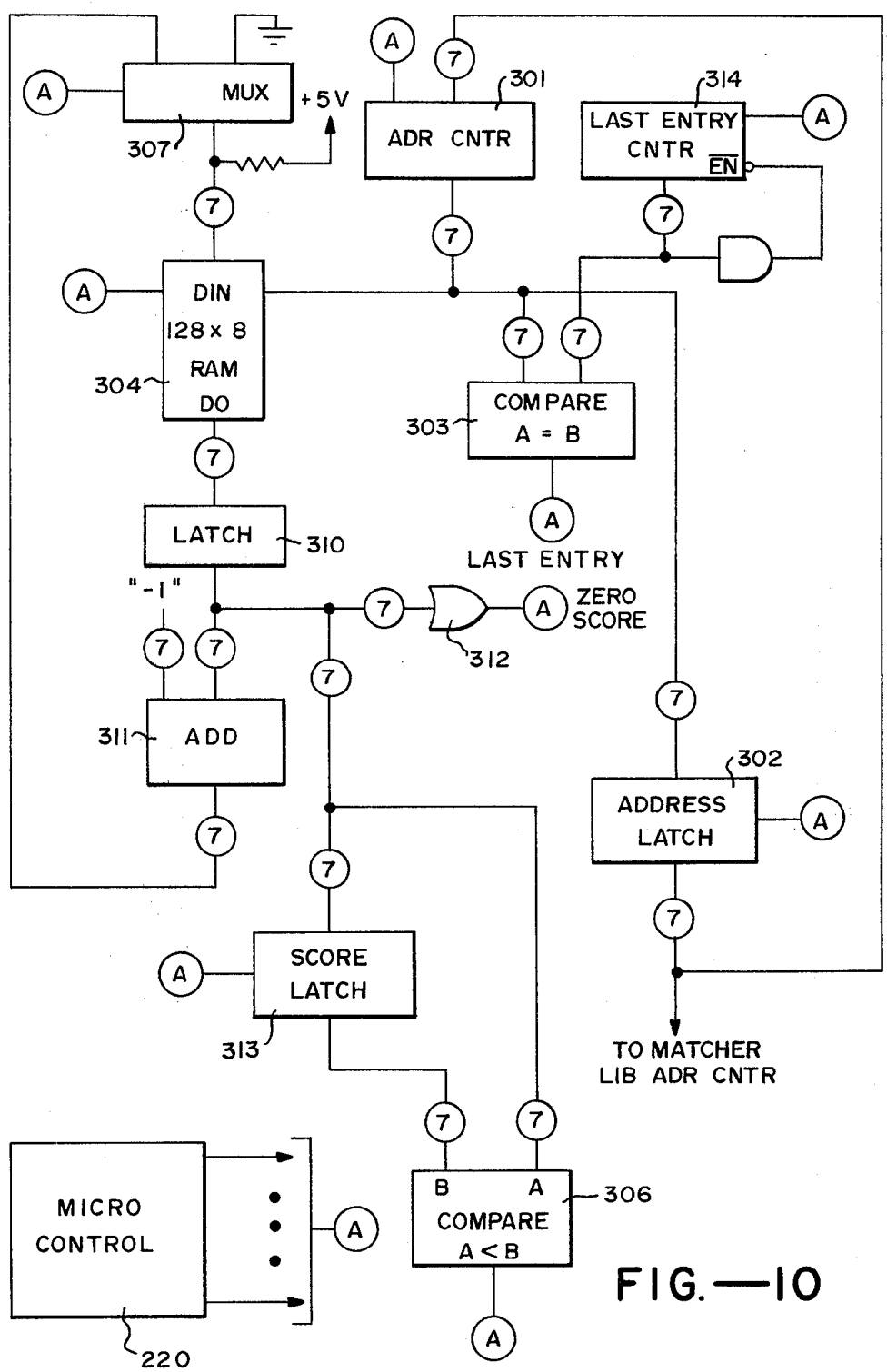
FIG.—10

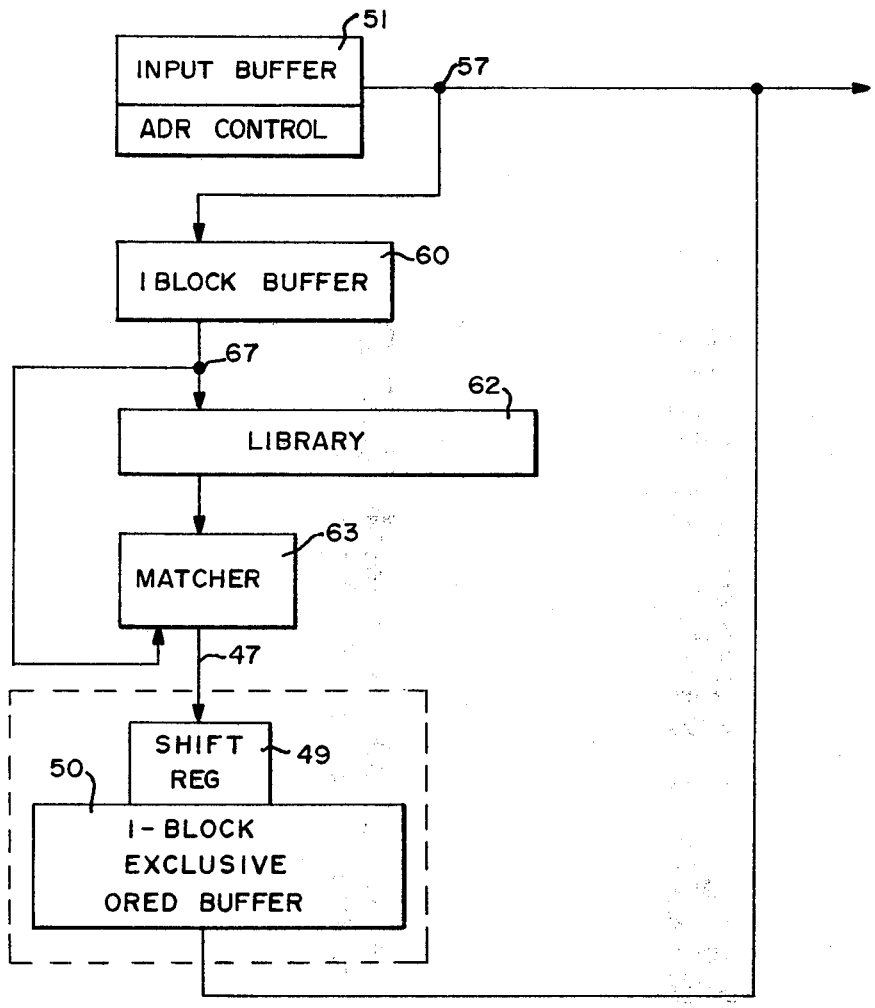
FIG.—12
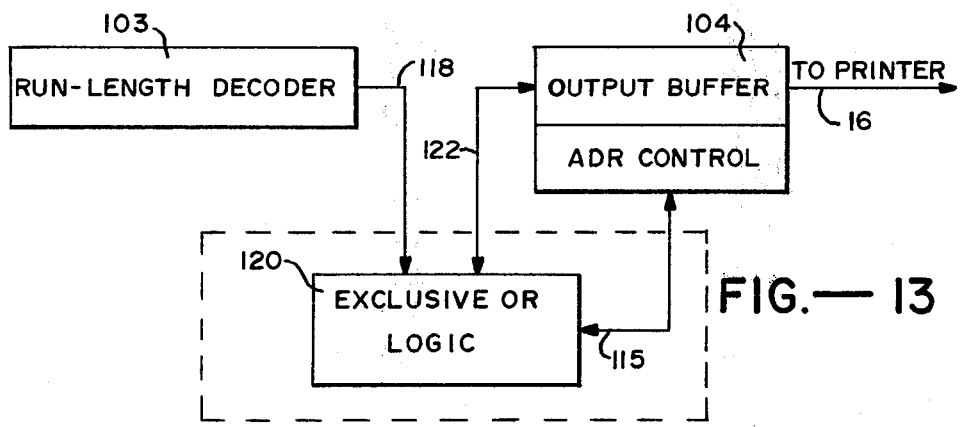
FIG.—13

DUAL MODE FACSIMILE CODING SYSTEM AND METHOD

This is a continuation, of application Ser. No. 069,551 filed Aug. 24, 1979, now U.S. Pat. No. 4,288,782.

CROSS-REFERENCE TO RELATED APPLICATIONS

"High-Speed Character Matcher and Method", invented by Ronald S. Bader et al., Ser. No. 069,258, filed Aug. 24, 1979, now U.S. Pat. No. 4,288,782, and assigned to the same assignee as the present application.

BACKGROUND OF THE INVENTION

The present invention relates to facsimile coding systems and methods for use in the fields of facsimile compression, optical character recognition, and image correlation. In the prior art, most facsimile coding systems have generally been based upon the concept of run-length coding, which provides relatively high compression ratios for a graphic type document or an alphanumeric document containing a small amount of text. However, the achievable compression ratio drops appreciably if a document is densely filled with alphanumeric symbols because the black and white run-lengths become quite short. Dense alphanumeric documents can be efficiently coded by character recognition techniques in which individual characters are detected and coded by a prototype library code. However, such a method cannot effectively handle documents containing a mixture of alphanumerics and graphics.

One prior art approach to this problem has been to segment a document into strips containing alphanumeric text or graphics data, and then code the former by character matching and the latter by run-length coding. The problems with this approach are the difficulty of document segmentation and the drop in compression performance if the segmentation is not accurate.

In view of the above background, it is an objective of the present invention to provide an improved facsimile coding system.

SUMMARY OF THE INVENTION

The present invention relates to a facsimile coding system and method.

A document comprising symbols representing alphanumeric characters and non-symbols representing graphics characters is scanned line by line and all isolated symbols that are expected to recur in the document are extracted and coded by a symbol matching process. While an isolated symbol often represents an alphanumeric character, the technique to be described herein can isolate any spatially isolated black and white pixel pattern representing, for example, Chinese or Japanese characters and the like, as well as alphabetical and numerical characters. It is to be understood that the term "symbol", according to the present invention, encompasses any spatially isolated black and white pixel pattern, and that "non-symbol" encompasses a non-isolated black and white pixel pattern.

The remainder of the document, comprising non-symbols and called the residue, is coded by two-dimensional run-length coding. The segmentation method permits document symbols to be coded by symbol matching without interference from the graphics portions of a document and eliminates symbols from that portion of the document that is run-length coded. The result is an efficient match between the type of data and the chosen coding method.

In operation, a number of scan lines equal to about two to six times the average character height are stored in a scrolled buffer. The data is then examined line-by-line to determine if a black picture element (pixel) exists. If the entire line contains no black pixel, this information is encoded by an end of line code. If a black pixel exists, a blocking process is conducted to isolate the symbol. For those isolated symbols, the system determines if a replica of the symbol under examination already exists in a library containing a plurality of coded symbols. This process involves the extraction of a set of features, a screening operation to reject unpromising candidates and finally a series of template or pattern matches. The first blocked character and its feature vector are always put into the prototype library and as each new blocked character is encountered, it is compared with each entry of the library that passes the screening test. If the comparison is successful, the library identification (ID) code is generated and transmitted along with the location coordinates of the symbol. If the comparison is unsuccessful, the new symbol is both transmitted and placed in the library. Those areas of a document in which the blocker cannot isolate a valid symbol (i.e., a non-symbol) are assigned to a residue and a two-dimensional run-length coding technique is used to code the residue data. The residue code, the identification code and the code of any unsuccessfully compared symbol are combined into a compressed digital serial data stream for transmission to a receiving location.

In order to implement the above technique, the system includes means for dynamically segmenting digital uncompressed raster data representing symbol and non-symbol data on a document and means for encoding the segmented symbol and non-symbol data. Storage means are included for storing a plurality of prototype symbols.

The system includes means for generating an identification code representing a symbol and its location on a document when the stored and the segmented symbol are successfully matched.

The system includes means for storing the segmented symbol in the storage means when the comparison of the segmented symbol and a plurality of the storage prototype symbols is unsuccessful. The system also includes means for combining the run-length coded residue, the identification code and the segmented data representing the unsuccessfully matched symbols into a digital bit stream for transmission.

In accordance with the above summary, the present invention achieves the objective of providing an improved facsimile coding system and method for use in the fields of facsimile compression, optical character recognition and image correlation.

Other objects and features of the present invention will appear from the following description when taken in conjunction with the accompanying drawings.

BRIEF DESCRIPTION OF THE DRAWINGS

FIG. 1 depicts a facsimile coding system.

FIG. 2 depicts a dual mode facsimile coder technique according to the present invention.

FIGS. 3A and 3B depict run-length features of a typical symbol.

FIG. 4 depicts a diagram of transmission of blocked symbols according to the present invention.

FIG. 5 depicts a block diagram of a compressor, which forms a portion of FIG. 1.

FIG. 6 depicts a block diagram of an input buffer, which forms a portion of FIG. 5.

FIG. 7 depicts a block diagram of byte processor elements used in feature extraction, which forms a portion of FIG. 5.

FIG. 8 depicts a block diagram of a microprogrammed controller, which forms a portion of FIG. 5.

FIG. 9 depicts a diagram of a feature screener, which forms a portion of FIG. 5.

FIG. 10 depicts a diagram of a library manager, which forms a portion of FIG. 5.

FIG. 11 depicts a block diagram of an expander, which forms a portion of FIG. 1.

FIG. 12 depicts a modification of the compressor of FIG. 5 in order to implement the information preserving mode according to the present invention.

FIG. 13 depicts a modification of the expander of FIG. 11 in order to implement the information preserving mode.

DESCRIPTION OF THE DRAWINGS

Referring to FIG. 1, a block diagram of a facsimile coding system 20 is illustrated in which a high speed page scanner 10 feeds a compressor 30 with a black/white threshold bit stream on communication path or bus 17 representing a document or image in raster format for transmission through a communication network 13. The compressor 30, which forms a portion of facsimile coding system 20, processes the documents a page at a time to generate an asynchronous compressed bit stream representing the raster data in coded form and outputs this bit stream on bus 18 into the terminal buffer memory 12. The asynchronous stream is transmitted from buffer memory 12 through communications network 13 where the stream is transmitted through buffer memory 14 to an expander 40 at the receiving location where the original image is regenerated. A high speed page printer 11 connected to expander 40 via bus 16 will then print the document or image originated from the transmitting location.

In FIG. 1, the performance requirements placed on the compressor 30 and expander 40 are best described in terms of two factors: compression factor and image quality. It is an objective of the present invention to develop a compressor/expander that will provide compression factors of 40:1 or greater on typical facsimile images scanned at 200 lines per inch (lpi) while preserving essential information contained on the original image.

In FIG. 1, page scanner 10 is known apparatus that will scan a document or image and perform preprocessing functions necessary to generate a binary (black/white) image. Scan density is typically 200 lines per inch, both horizontally and vertically. Typical page sizes will be $8\frac{1}{2} \times 11$ inches, with portrait (left-to-right, top-to-bottom) input orientation.

The scanner provides the image in a raster format on bus 17 with necessary page and line sync signals as well as a data signal and clock signal.

In FIG. 1, the expander 40 will provide on bus 16 the binary image in a raster format for connection to printer 11. Print line density is 200 lines per inch both horizontally and vertically. Page size typically is $8\frac{1}{2} \times 11$ inches. Expander 40 provides the image in a raster format with necessary page sync, line sync, data and clock signals.

The compressor 30 asynchronously provides the compressed data as it is generated on bus 18 to a system buffer 12. Buffer 12 is directly connected to compressor 30 and provides approximately 500,000 bits of storage per page. The data in buffer 12 is emptied into the communication network 13 prior to the input of the next page data. Expander 40 asynchronously receives compressed data from a terminal buffer 14 via bus 15. Typically, network 13 introduces errors into the data bit stream at the rate no greater than one in ten million.

DUAL MODE COMPRESSION TECHNIQUE

The compression technique according to the present invention is described in the following sequence of operations.

First, the raster image is scanned, one line at a time, until a black picture element (pixel) is found, which is called a "key pixel". The local area around the key pixel, called a "trial block", is examined to isolate a small pattern of black and while pixels, called a "symbol", roughly the size and shape of an alphanumeric character. If no symbol is found within the trial block, the trial block is left as a residue. The blocker is designed to avoid the residue in subsequent searches for key pixels. Residues are encoded using a modified relative address code.

In one embodiment of the present invention, when symbols are isolated, labeled and removed from further key pixel consideration, the blocks are used to build a library against which other symbols may be matched. In this manner, the library can be built from an initial empty condition with each new page, and updated as new symbols are found. A set of features measured for each symbol is also stored in the library.

As each new symbol is found, its features are compared to the features of blocks in the library. Then library entries with features most like the new blocks are treated as candidates for the matching process.

Library candidates are aligned with the trial symbol block, and a pixel by pixel comparison is made. If the matching error is less than a predetermined threshold, the matching process is stopped and the identification of the matching library member is stored for later coding. If no match is found, the block is stored in its entirety as a "prototype" block which is also entered into the library.

When a line has been completely processed, i.e., all pixels in the line have been labeled as either "residue" or "symbols", the code bits for the residue are concatenated with the code bit for the symbols, a line sync code is added, and the resulting sequence is transmitted as the data stream on bus 18.

At the receiving location, the expansion technique in expander 40 of FIG. 1 results in the following operations.

First, portions of the input data stream on bus 16 carrying the code for one line of image are isolated. The lines are separated by special "end of line" code words. The code format is used to separate residue from symbol code. The codes are processed separately.

The residue code is used to regenerate non-symbol residue. The prototype code is used to generate a library of symbol blocks and the matched code is used to select library entries. The residues, prototypes and matched blocks from the library are then combined and the resulting raster data on bus 16 are sent to page printer 11 for printing of the document.

The dual mode coding system and method is illustrated in block diagram form, FIG. 2, and provides a system that possesses the advantages of extended run-length encoding and symbol recognition systems.

In operation, "In" scan lines (physically about two to six times the average symbol height) of binary image date are stored in a scrolled buffer. A key pixel search is initiated in block 21 to determine if a black pixel exists. If the entire line contains no black pixel, the information is encoded by an end of line code in residue coding block 32.

On the other hand, if a black pixel exists, a blocking process in symbol blocking block 22 is conducted to block the symbol. For those blocked symbols, further processing is required through symbol determination block 23, feature generation block 25 and screening block 26 to determine if a replica of the symbol in question already exists in symbol prototype library block 33. This process involves the extraction of a set of features, a screening process to reject unpromising candidates, and finally a series of template or pattern matches.

The first blocked symbol and its feature vector are always put into the prototype library 33 and as each new blocked symbol test is encountered, it is compared with each entry of the library that passes the screening test.

If the comparison is successful, the library identification code from coding block 28 along with the location coordinates are transmitted. If the comparison is unsuccessful, the new symbol is both transmitted with a prototype code from block 34 and also placed in prototype library block 33. Those areas in which symbol determination block 23 cannot properly block the symbol are assigned to residue block 32 and a two-dimensional run-length coding technique is used in coding block 32 to code the residue data. All of the codes are then sent to bit stream formation block 29 for concatenation into an asynchronous digital bit stream on bus 18.

Input Buffer

The facsimile data to be processed is stored in an input buffer that "scrolls" through the input document by rotating the addressing of the input memory such that the newest line that enters the buffer is written over the oldest line. Typically, the buffer contains 128 scan lines.

Symbol Blocking

The function of the key pixel and symbol blocking blocks 21, 22 of FIG. 2 is to examine the input buffer in a systematic fashion and to locate the position and size of any isolated characters. A pixel in the input buffer, denoted below by the character "1", is considered to be a key pixel whenever it is black and the three neighbors immediately located above it and the neighbor immediately preceding to its left are white, as shown,

```
  . . .
  . 1
```

Whenever a key pixel is encountered, block 22 of FIG. 2 is initiated. It will try to find the smallest rectangle that contains the key pixel at its top and is delimited by a border of blank pixels. The size of the blank border is ordinarily one, but may be two if it is known that the characters being blocked are well-separated. Using a double border minimizes the chance of fragmenting broken characters. If such a rectangle can be found, its border should fit into a 32×32 array. An example illustrating the blocking algorithm for the case of a double border is illustrated in Chart I below.

The description of the method is somewhat complex because it is designed to be performed on a byte memory for economic reasons. Therefore, each access to the memory must fetch eight contiguous pixels lying within the byte boundaries delineated by the vertical lines in Chart I.

Referring to chart IA, starting directly to the left of the pixel, the blocker tries to detect the double border in a clockwise motion using an algorithm based on byte access for lower cost and increased speed. The algorithm is performed directly on the input buffer as follows in Chart IB:

Step 1—bytes 4 . . . , 2 . . . , 0 . . . are accessed
Step 2—bytes 4 . . . , 1 . . . , 3 . . . , 5 . . . are accessed
Step 3—bytes 7 . . . , 9 . . . , B . . . , D . . . , F . . . , H . . . , J . . . are accessed
Step 4—byte L . . . is accessed
Step 5—bytes K . . . , I . . . , G . . . are accessed
Step 6—bytes E . . . , C . . . , A . . . , 8 . . . , 6 . . . , 4 . . . , 2 . . . , 0 . . . are accessed Chart IC illustrates the resulting blocked symbol with double border.

CHART I

A

```
|x.......|........|..........|........|........|.......x|
|xxxxxx..|........|..........|........|.......x|xx......|
|xxxxxxx.|........|.....@xx  |....x...|..xxxxxx|xx......|
|xxxxxxxx|xxxxx...|...xx x xx|.xxxx..x|xxxxxxxx|xxxxxx..|
|xxxxxxxx|xxxxxxxx|..xxx x xx|........|..xxxxxx|xxxx....|
|xxxxxxxx|xxxxxx..|...xx x xx|...xx...|......xx|xx......|
|xxxxxxxx|xx......|..........|........|........|xx......|
|xxxxxx..|........|.....x xx |.xxx....|........|........|
|xxxx....|........|...... xx |........|........|........|
|x.......|........|..........|........|........|xxxxxxx.|
|........|........|..........|........|........|....xxx.|
```

Area containing key pixel
key pixel @
(the byte boundaries are shown as "|")

B

```
|x.......|........∅......... 1 .........|........|.......x|
|xxxxxx..|........2 ..........3 .........|.......x|xx......|
|xxxxxxx.|........4 .....@xx 5 ....x...|..xxxxxx|xx......|
|xxxxxxxx|xxxxx...6 ...xx x xx 7 .xxxx..x|xxxxxxxx|xxxxxx..|
|xxxxxxxx|xxxxxxxx8 ..xxx x xx 9 ........|..xxxxxx|xxxx....|
|xxxxxxxx|xxxxxx..A...xx x xx B...xx....|......xx|xx......|
|xxxxxxxx|xx......C........ D.........|........|xx......|
|xxxxxx..|........E...... x xx F .xxx....|........|........|
|xxxx....|........G...... .xx H.........|........|........|
|x.......|........I ........ J .........|........|xxxxxxx.|
|........|........K...... ... L.........|........|....xxx.|
```

C

```
|...... ...|........|
|...... ...|........|
|.....@xx  |....x..|
|...xx x xx|.xxxx..|
|...xxx x xx|........|
|...xx x xx|...xx..|
|...... ...|........|
|..... x xx|.xxx...|
|...... .xx|........|
|...... ...|........|
|...... ...|........|
```

Resulting blocked symbol
with double border

A more detailed description for the Chart I above is as follows:

0-Set bottom pointer to the key pixel row and set left margin to the column of the key pixel and decrement by 2.

1-Test for a double border starting directly to the left of the key pixel and ending two rows above the key pixel. If it is not found, go to the next key pixel. During this operation, check for the beginning of an horizontal double border to the right if the key pixel is not the least significant bit of a byte.

2-Start or keep on following the horizontal double border to the right and, at the same time, try to detect a descending double border to the right of the key pixel. If the horizontal double border to the right stops before a descending double border has been found, or if no descending border is found before the length of the horizontal border to the right reaches 32 columns, go on to the next key pixel. As soon as the descending border is found, go to step 3.

3-Try to follow the descending double border, and, if necessary, update the bottom pointer. At the same time, try to find an horizontal double border to the left if present position is not above the bottom pointer. If no horizontal border is found to the left before the descending border has reached a length of 32 rows, go find the next key pixel. If the descending border is a "dead end street" go back to continue step 2. Once an horizontal double border to the left is found, go to step 4.

4-Try to follow the horizontal double border to the left, and, if necessary, update the left margin. At the same time, start checking for an ascending double border if present position is not to the right of the left margin. If the path is a dead end, go back to step 3. If no ascending double border is found before the length of the horizontal border to the left reaches 32 columns, go on to find the next key pixel. If an ascending border is found, go to step 5.

5-Try to follow the ascending double border until the level of the border on top of the key pixel is reached. Then try to connect them. If the path upwards is a dead end, go back to step 4. If no connection is made, go to the next key pixel. If a connection is made, the symbol is stored with its borders in a 32×32 RAM. The symbol is then erased from the input buffer.

Feature Extraction

The purpose of feature extraction is to represent the character in a compact fashion in order to expedite the comparison of pairs of symbols. In the preferred embodiment, features are not used to make a final decision as to whether a pair of symbols are matched, but rather to eliminate unworthy symbols from consideration by the template matching block 27 of FIG. 2. Thus, a good set of features should provide good separability in "feature space" (i.e., similar symbols should be close together and dissimilar symbols highly separated). It should be much easier to compute the features than the template matching error in order to justify using them.

The features used in the screening process are derived from horizontal and vertical run-length statistics. Essentially, the principal features are the averages of the first run-length, last run-length, and the number of transitions encountered in both the horizontal and vertical directions. FIG. 3 illustrates an example of run-length features.

Consider the following binary string depicted below:

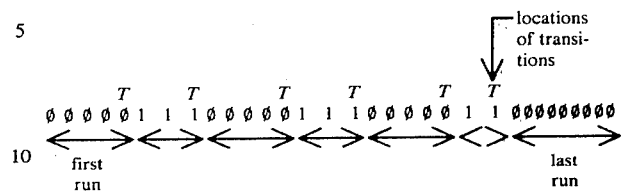

The first/last run is defined as the length of the first-/last run of contiguous zeroes. If S(k) is the state of the kth element of the string (0 or 1), then a transition is said to occur at k if S(k) is not equal to S(k+1). The transitions in the example string above are indicated by "T".

The features are normalized in such a way as to provide a tolerance to variations in scanning density. Specifically, for a character with vertical dimension "NROWS" and horizontal dimension "NCOLS", let HF(I)=The length of the I-th horizontal first run
HL(I)=The length of the I-th horizontal last run
HN(I)=The number of transitions in the horizontal dimensions for the I-th line where I=1, 2, 3, ..., NROWS. Then, the normalized horizontal first run length is:

$$F(1) = \frac{1}{(NROWS)(NCOLS)} \sum_{I=1}^{NROWS} HF(I) \quad [1]$$

The normalized horizontal last run length is $$F(2) = \frac{1}{(NROWS)(NCOLS)} \sum_{I=1}^{NROWS} HL(I) \quad [2]$$

The normalized horizontal number of transitions is $$F(3) = \frac{1}{(NROWS)} \sum_{I=1}^{NROWS} HN(I) \quad [3]$$

where F(1), F(2), F(3) denote the values of features 1, 2, and 3.

The (1/(NROWS)(NCOLS)) factor in F(1) and F(2) is included in order to insure that the feature values remain invariant when the character is scanned at different densities in either horizontal or vertical dimensions. The normalization factor for the number of transitions is merely (1/NROWS) since the number of transitions in a given binary string is unaffected by changes in the lengths of the runs.

Features 3, 4, 5 are analogous to 1, 2, 3 except that they are based on vertical run-lengths instead. Let:

VF(I)=The length of the I-th vertical first run
VL(I)=The length of the I-th vertical last run
(VN(I)=The number of transitions in the vertical dimension for the I-th column where I=1, 2, 3, ..., NCOLS. Then, the normalized vertical first run length is:

$$F(4) = \frac{1}{(NCOLS)(NROWS)} \sum_{I=1}^{NCOLS} VF(I) \quad [4]$$

The normalized vertical last run length is $$F(5) = \frac{1}{(NCOLS)(NROWS)} \sum_{I=1}^{NCOLS} VL(I) \quad [5]$$

The normalized vertical number of transitions is $$F(6) = \frac{1}{(NCOLS)} \sum_{I=1}^{NCOLS} VN(I) \quad [6]$$

where F(4), F(5), F(6) denote the values of features 4, 5 and 6.

The six features described above are invariant to changes in magnification, and thus provide a degree of noise immunity. However, total scale invariance is undesirable since this would tend to confuse pairs such as "O" and "o". Consequently, three other features are incorporated into the set in order to prevent characters of grossly different sizes from having exactly the same vector. They are

F(7)=NROWS
F(8)=NCOLS
F(9)=BLACKCOUNT

Features 7, 8 and 9 require no additional calculation, since these parameters are determined during the blocking process.

Library Maintenance and Scoring System

In one embodiment, a fixed library size of 128 elements is used in symbol prototype library block 33 of FIG. 2. The first blocked symbol and its feature vector occupy the first library slot and subsequent library slots are occupied by those blocked symbols that do not pass the screening and matching tests. In order to prevent the library from overflowing, a scoring system is employed to determine the usefulness of the library elements. When the library is filled, the least used prototype is bumped out of the library and replaced by a new prototype. At the receiver location, the same size library and same scoring system are utilized to maintain synchronization with the transmitter.

One scoring system used is a fixed stack library management system that is designed to avoid a catastrophic error due to a channel error. With a library size of N elements, the scoring system observes the following rules:

1. Every new prototype or matched symbol is assigned with a score (N-1).
2. The score for the rest of the library elements is decremented by 1.
3. The highest and lowest scores are limited to (N-1) and 0, respectively.

This mixed scoring system gives every "new prototype" or "matched symbol" at least N chances for a match.

After a symbol has been blocked, a decision threshold is applied to each prototype element of the library that has passed the screening test. If a match is indicated, the matching library ID, horizontal location with respect to the previous block, and vertical shift with respect to the prototype are coded. Otherwise, the binary contents of the blocked symbol are transmitted along with the symbol width, symbol height, and horizontal location with respect to the previous block. In addition, the symbol is placed in the library as a new prototype element. FIG. 4 defines the transmission code for blocked symbols.

Compressor Block Diagram

Referring now to FIG. 5, compressor 30 of FIG. 1 is depicted in more detail in which raster data from the page scanner 10 of FIG. 1 is input on bus 17 to input buffer 51, which holds 128 scan lines of data for processing. Buffer 51 also supplies blocked symbols to the matcher 63 via one-block buffer 60 and library memory 62. Buffer 51 also supplies residue to the run-length coder 80 of FIG. 5.

A byte processor array 52, illustrated in FIG. 2 as byte processor 52-1, . . . , 52-2, is connected to input buffer 51 via bus 57. Array 52 searches for key pixels in the input buffer, blocks symbols in the input buffer 51 and extracts features from the blocked symbols. Processor array 52 also replaces the blocked symbols with zeroes in input buffer 51 after they are transferred to the 1-Block buffer 60 and supplies symbol features to the screener 64. Processor array 52 will be described in more detail in FIG. 7.

In FIG. 5, the screener/manager 64 is connected to library 62 via bus 73 and to matcher 63 via bus 71. Screener 64 is also connected to feature buffer 61 via bus 74 and to code combiner 81 via bus 68.

Screener 64 measures the feature distance between each blocked symbol and each library number as previously described. Screener 64 also selects the best library candidates for matching in matcher 63. Screener 64 also updates the feature library 62 with the blocked symbol and features if no match is made.

Matcher 63 scores each prototype library candidate selected by the screener 64 on the basis of template matches in nine different registrations. Matcher 63 notifies the screener 64 of match/no match decisions and updates the library 62 with the blocked symbol if no match is made. A suitable symbol matcher for use in the present invention is described in more detail in the cross-referenced application entitled "High Speed Character Matcher and Method".

In FIG. 5, the library 62 is connected to matcher 63 and screener 64 via buses 72, 73, respectively, and to buffers 60, 61, via buses 67, 74, respectively. Library 62 accepts prototype block symbols and associated feature sets, maintains a usage scoring system for each library entry and removes the lowest ranked symbols when the library 62 overfills.

In FIG. 5, run-length coder 80 is connected to receive residue data from input buffer 51 on bus 57. Coder 80 accepts bytes of data for residue coding from buffer 51 which are five bytes behind the key pixel scanner. Coder 80 codes these inputs into a two-dimensional run-length code. A suitable coding scheme is described in more detail in an article entitled, "Two-Dimensional Facsimile Coding Scheme," IBM Research Center, New York, pp. 8.7.1–8.7.5.

Buffer 80 is connected to code combiner 81 via bus 82. Combiner 81 accepts run-length codes from the run-length coder 80 and character ID's on bus 68 from screener 64 and prototypes from the matcher 63 on bus 67. Combiner 81 assembles the output data into proper format on bus 18 for connection to the buffer 12 of FIG. 1.

The operation of compressor 30 of FIG. 5 is controlled by microprogram controller 54 which is described in more detail below.

Input Buffer

Referring now to FIG. 6, the input buffer 51 of FIG. 5 is depicted in more detail and comprises a byte-organized random access memory (RAM) 134 and associated addressing logic.

Ram 134 is implemented using dynamic RAM chips. The constant writing of scanner data on bus 17-1 from the scanner 10 of FIG. 1 keeps RAM 134 refreshed so that no refresh logic is required.

The organization of input buffer 51 of FIG. 6 is as follows: each row of 1728 pixels is represented as 216 consecutive bytes. In order to facilitate row addressing, each new row starts on a multiple of 256 bytes. Thus the last 40 out of every 256 bytes are unused and the total usable buffer can be considered as an array of 216×128 bytes.

In FIG. 6, two sets of row and column counters together with multiplexer or selector 132 are shown. One set, column counter 130 and row counter 131, control through multiplexer 132 and bus 135 the writing of scanner data on bus 17-1 through serial to parallel converter 133 into RAM array 134. Scanner clock signals on bus 17-2 are input to a divide by eight circuit 138 to column and row counters 130, 131, which also receive an end of line (EOL) signal on bus 137.

The second set, column counter 141 and row counter 143, together with respective register files 140, 142, control through multiplexer 132 and bus 135 the reading of data for processing and for clearing out blocked symbols.

A subtractor (not shown) compares the two row addresses and inhibits processing unless the scanner is at least 32 rows ahead of the processing row. Since the comparison is modulo 128, it is valid even after either counter has "wrapped around" from row 127 to row 0. Thus, input buffer 51 can be considered as a circular buffer with a read pointer always chasing the write pointer but never being allowed closer than 32 behind it.

Although the scanner row and column counters 130, 131 are conventional up-binary counters, the processor row and column counters 141, 143 are up/down pre-settable counters. This allows the processor to randomly access any one of eight neighboring bytes relative to the current byte, and also to jump to a previously accessed byte. This latter function is provided by a four-register file 140, 142 associated with each counter 141, 143, respectively.

The operation of the counter and register files is controlled by microprogram bits from the controller described in conjunction with the description of FIG. 7.

Byte Processor Array

Referring now to FIG. 7, the byte processor elements of FIG. 5 used in feature extraction are depicted in more detail. A byte processor array 52 of FIG. 5 is described as a single functional block rather than described as a separate key pixel scanner, symbol blocker, and feature extractor because it is primarily a collection of dedicated processing elements, many of which are common to all three of the above functions. The processing elements are organized so that as each byte is accessed from buffer memory, all operations that must be performed on the byte can be performed in one byte access time, which means that the buffer memory can be accessed at the maximum rate the memory chips will allow.

In FIG. 7, all of the processing elements, as well as the buffer row and column counters, are controlled by a microinstruction ROM, latch, and sequencer (adder) that together form a microprogrammed controller.

The controller executes one of its three microprograms depending upon whether it is key pixel searching, blocking, or extracting features. Each of the algorithms has been described above, and the operation of the hardware is now described for the feature extraction process to illustrate the operation of the various byte processing elements. RAM 160 and AND gates 161 form a border mask which masks out unwanted pixels if the current byte overlaps a block border as determined by the symbol blocker.

The total black pixel count in each byte is determined by a lookup table in ROM 170 and the results are added to an adder 171 and the results latched in latch 173.

Horizontal transitions are determined in a similar manner in ROM 175, adder 176, and latch 177 except that an additional flipflop (not shown) is used to link transitions from the previous (horizontal) bytes.

Vertical transitions are determined by forming the exclusive-OR gates 187 of each byte with the byte above it and using a lookup ROM 188 to add the count to adder 189, the results of which are latched in latch 190. Since the bytes will be accessed left to right rather than up-down, a five-byte register file 186 is used to save all bytes from the previous (upper) row. Vertical first runs and last run sums are measured by forming the accumulated-OR in OR-gates 203 of all bytes in each column. The number of white pixels is determined by a table in lookup ROM 204 added in adder 205 to latch 206. A five-byte register file 202 is used to hold the accumulated OR of the bytes in each column. Horizontal first runs are measured by using a ROM 180 to look up the number of leading white pixels in a byte and adding the count to adder 181 and storing the count in latch 182. When the first black pixel of a given row is found, the accumulation for that row is terminated via a STOP signal from flipflop 184.

In the feature extraction process, two complete passes through all the bytes in a block are made. The first pass is made from left to right, top to bottom, during which all of the operations described above are performed.

The second pass is made from right to left, bottom to top, during which two additional features, vertical and horizontal last runs, are measured. Vertical last runs are measured in the same way using the same hardware as vertical first runs; horizontal last runs are measured in the same way as horizontal first runs, except that the ROM 204 looks for trailing rather than leading white pixels.

All byte operations described are performed in parallel within the time it takes to access each byte from the buffer. The reason for the high speed performance of the pixel searching, blocking, and feature extraction operations is that no individual bit operations requiring shifting are performed. The performance can be estimated by considering the number of byte accesses per blocked symbol. The key pixel search program passes through every byte in the block once, in addition to the bytes between blocks. For the busiest character line, it is assumed that the key pixel accesses, on the average 1/80×216×32 or about 86 bytes per character.

For this type of character line, the average block size is about 2.7 bytes across by 24 bytes down. On the average, this will require 3.7 byte columns to block the character. For worst case considerations, these calculations ignore the document margin.

The blocking technique never requires more than a single complete pass through the block and in many cases, less. For a worst case number, it is assumed that the blocker must access 3.7×24=89 bytes. The feature extractor then makes two more passes of 89 bytes each and one final pass is required to clear the block out of the buffer. The total is then 86+4×89=442 byte access per blocked character.

Template Matcher

The template matcher 63 of FIG. 5 compares the bit pattern of each blocked symbol with bit patterns of candidate symbols that have been selected from the library by the screener. The three error criteria are (1) raw pixel error, (2) cleaned exclusive-OR error, and (3) isolated pixel error. Further details of the template matcher 63 of FIG. 5 are described in more detail in the cross-referenced application entitled "High-Speed Character Matcher", the details of which are hereby incorporated by reference.

Microprogrammed Controller

Referring now to FIG. 8, a microprogrammed controller is depicted and includes a counter 231 which holds a ROM address and a ROM 232 that supplies a new address to latch 233 in addition to supplying control signals to the system being controlled on bus 238.

The latch 238 is used to hold the output of the ROM so that a new microinstruction can be accessed while the previous one is being executed.

A multiplexer 230 is used to select an external condition under which the counter will be parallel loaded rather than incremented.

In FIG. 8, counter 231 has a synchronous clear input on bus 234. Counter 231 has a choice of three possible addresses for the next microinstruction:

(1) The next sequential address specified on clock line 235;
(2) The jump address on bus 239 selected by the microinstruction if the condition selected by the microinstruction is true; and
(3) Address zero if the reset line 234 is selected.

Controllers such as depicted in FIG. 8 are used in the compressor to control the byte processor array 52, to the library screener/manager 64 and the run-length coder 80 of FIG. 5. The main advantage gained by using microprogrammed controllers is algorithm flexibility. In most cases, algorithms can be changed by changing microcode only. When more control signals are needed, the microinstruction word can be expanded in width by adding more ROMs and latches. A typical microinstruction size for the byte array controller is 256 words by 48 bits.

Screener

Referring now to FIG. 9, a block diagram of the feature screener 64 of FIG. 5 is depicted which incorporates a microprogrammed pipeline approach to facilitate high speed calculations. Microcontrol 220 controls the screener of FIG. 9 as depicted by "A".

In FIG. 9, when the fourteen one-byte features are extracted by the feature extractor for a given candidate they are transferred under microprogrammed control via bus 250 to a 16×8 register file 251. At this point, library address counter 252 is reset to zero and the first feature of the first library entry in library 253 is accessed along with the corresponding feature of the candidate from register file 251. These two 8-bit features are temporarily latched in latches 255, 256 allowing the second set of features to be accessed on the second clock cycle while processing on the first set continues.

During cycle 2, the 8-bit library feature in latch 256 is two's-complemented in complement circuit 257 and added with the candidate feature in adder 258. The difference between the two features is latched in latch 259 producing the second stage of the pipeline.

During cycle 3, the difference is either added to or subtracted from the running sum in the ALU circuit 260 (which for the first feature is zero) depending upon whether the difference is positive or negative, respectively. This produces a sum of the absolute value of the differences between the library entry features and those of the candidate. After the 12-bit sum is totalled for a particular library entry (on the 17th cycle) it is transferred from latch circuit 262 into the appropriate address in 128×12 error metric library 263. A library entry counter 264 points to the last entry made in library 263. When the library address counter 265 reaches a value equal to the value in entry counter 264, a flag is raised by binary comparator 266 informing the microcontroller 220 it has completed its differencing calculations for every member of the current library.

On the cycle following this event, the library address counter 265 is reset and the first metric in the library 263 is compared in comparator 269 against the contents of the 12-bit latch 267 that is preset to all ones. The smaller of the two numbers (which is the first entry) and its associated library ID are stored in latch 267 and 268, respectively. On the second cycle this error metric is compared in comparator 269 to the one for the second entry. This process continues until comparator 266 indicates all entries have been screened. At this point, the ID of the entry with the smallest error metric is presented to the template matcher 63 of FIG. 5 and the metric for this entry is set to all ones in the library 263 so that it is not chosen again on subsequent passes.

While the template matcher is processing the first choice, the minimum process is repeated and the next smallest error metric is chosen in the same fashion simultaneously. If at the end of the template matching process, it is determined that the candidate is a new prototype, the screener's feature library address counter 252 is set to the appropriate entry address by the library manager of FIG. 10 and the candidate's features are transferred from the 16×8 register file 251 to the feature library 253 which in conjunction with the template library update completes library maintenance.

In a worst case, fourteen cycles are required to update the library entry. Fourteen "sum of difference" cycles plus one "store" cycle for each of the 128 entries and 129 cycles for each "find the minimum" pass. Subsequent select candidate passes are performed in parallel with the matching process.

Library Manage

Referring now to FIG. 10, the library manager of FIG. 5 is depicted in more detail, the purpose of which is to maintain the library scoring systems and inform other components of the system of where each entry is to be put in the library. The library manager is controlled by controller 220, as indicated by "A".

When a library replacement command is received, the manager zeroes address counter 301 which points to the score of the first library entry. On the second cycle of the process, if the score is not zero, it is compared to the contents of a seven-bit latch 313 in comparator 306. The contents of latch 313 is initialized to all ones. If the score is smaller than the contents of latch 313, the new minimum score is saved in latch 313 along with its associated ID number in latch 302. Simultaneously, a "−1" is added in adder 311 to the score, and this decremented score is stored back through multiplexer 307 into the appropriate location in 128×8 bit RAM 304. The minimum/decrement score process continues until either a zero score is detected or the last entry in the library comparator 303 goes active.

In the zero score case, the ID (address) of the entry is passed from latch 302 to the other blocks, and multiplexer (MUX) 307 on the input to RAM 304 is set to "tristate" causing a score of 127 to be loaded into RAM 304 for the new entry.

At this point, the scores of all remaining entries are also decremented. In the latter case, the minimum score and associated ID are stored in latches 313, 302, and when the flag goes active, the ID is transferred and the new entry score is set to 127 from counter 314.

In a worst case, the total of 2×128 cycles are required for the search and update process plus one for the ID transfer.

Expander

Referring now to FIG. 11, the expander 40 of FIG. 1 is depicted in more detail, in which the asynchronous, digital compressed bit stream on bus 15 is connected to bit stream detector circuit 101, which is connected to bit stream decoder 102. As previously described, portions of the input data stream carrying the code for one line of the document are isolated and the lines are separated by special "end of line" code words. The code format is used by decoder 102 to separate the "residue" from the matched symbol code. The run-length code (RLC) generated on bus 109 by decoder 102 is connected to run-length decoder 103 and the residue signal generated on bus 118 is used to regenerate non-symbol-like data in buffer 104.

In a manner analogous to the storing of symbols in the compressor of FIG. 5, the received symbol codes of FIG. 11 are used to generate a library of symbol blocks in the library 107, in which the ID location on bus 111 is input to ID buffer 106 and binary prototypes on bus 112 are input to library 107.

The library manager 108 receives its control signals on bus 110 from decoder 102 and controls the "scoring" previously described of buffer 106 via bus 114. The ID codes generated by buffer 106 on bus 113 are input to library 107 and LOCATION signals on bus 115 are connected to the address control portion of buffer 104. The prototype library symbol blocks are connected from library 107 to buffer 104 via bus 116 and the residue and symbol matched blocks on buses 118, 116 are combined in buffer 104 for connection via bus 16 to page printer 11 of FIG. 1.

Information Preserving Coding

In the present invention, blocked symbols that meet the character definition criteria and that match a prototype character in the library are coded by the library prototype identification (ID) code. At the receiving location, the ID code is used to locate the library entry and place it in the reconstruction buffer. It should be noted that this process does not result in perfect reproduction of a symbol. A small tolerance in the symbol matcher is permitted so that the library can be maintained at a reasonable size. If perfect matching were to be demanded, the library would contain a large number of variations of the same alphanumeric character caused by binarization artifacts.

For most applications, the reproduction of a prototype symbol rather than its exact match is of no concern, assuming of course that the match is sufficiently precise to prevent symbol (alphanumeric character) substitution errors. However, there may be some applications in which information preserving coding is demanded so that the reproduced document is an exact pixel-by-pixel replica of the original. This type of operation can be achieved with a modification of the compressor 30 of FIG. 5 and expander 40 of FIG. 11. When a symbol match has been found, an "Exclusive-OR" difference is formed between the blocked symbol and the prototype. The Exclusive-OR difference is then placed in the residue, and the residue is coded by two-dimensional run-length coding.

At the receiver, the residue is combined with the appropriate prototype pattern by another Exclusive-OR operation to produce an exact replica of the original symbol.

As depicted in FIG. 12, in order to implement the information preserving mode, it is necessary to add an additional one-block buffer 50 and an 8-bit shift register 49. The input to the shift register 49 on bus 47 comes from the exclusive-OR of the two central pixels already generated in the symbol matcher 63. Shift register 49 performs serial to parallel conversion on these different pixels and stores them a byte at a time in the one-block Exclusive-ORed Buffer 50. At the completion of a symbol match process, if matcher 63 deems the match acceptable, it outputs the ID code as usual while the microprogrammed controller generates control signals to load the difference image back into input buffer 51 in the same location from which the original block was extracted.

The additional hardware needed in the expander 40 of FIG. 11 is shown in FIG. 13. Before reconstruction begins, output buffer 104 needs to be initialized to all zeroes in every location. When reconstruction begins, symbol pixels are loaded into output buffer 104 from the library as usual. Since residue is encoded after symbol extraction, its reconstructed pixels will always follow the reconstructed symbol pixels for associated raster positions. Therefore, its reconstructed pixels will always follow the reconstructed symbol pixels for associated raster positions. Therefore, as soon as residue pixels, including the difference images, are decoded by run-length decoder 103, the decoded pixels are transferred to the Exclusive-OR block 120 via bus 118 along with the associated symbol data via bus 122 already residing in the output buffer 104. These two groups of pixels are then Exclusively-Ored and the preserved pixel data is written back into the output buffer 104. As bytes are removed from the buffer 104 to be output on bus 16 to the printer 11 of FIG. 1, zeroes are written back into their locations to provide initialization for the next pass through the buffer 104.

A particular dual mode facsimile coding system and method has been described:

1. For segmenting a digital raster data stream into segmented symbols and non-symbols and encoding said symbols and non-symbols to form representative digital codes which are combined to form a compressed digital data stream, and 2. For receiving said compressed digital data stream, separating said representative codes to form first and second raster, and combining said first and second rasters to form an uncompressed raster data stream representing said symbols and non-symbols on said document.

It is apparent, however, that the present invention may be carried out by equivalent methods and components without departing from the teachings and scope of the invention.

While the present invention has been illustrated and described in a particular implementation of symbol isolation, it is to be understood that modifications to the dual mode concept described hereinabove can be incorporated by utilizing other known symbol recognition techniques. For example, rather than implementing symbol isolation techniques, the dual mode system and method could be implemented in which data representing symbols and non-symbols could be dynamically segmented using symbol matching techniques. Also, the dual mode system and method described hereinabove could incorporate optical character recognition (OCR) techniques by utilizing an OCR scanner, which is known apparatus that uses light-sensitive devices to recognize and identify symbols appearing on a document.

The preferred embodiment described herein and all equivalent systems and components are defined therefore by the following claims.

What is claimed is:

1. In a facsimile coding system, the method comprising the steps of segmenting an uncompressed digital raster data stream having pixels representing symbols and non-symbols on a document into spatially segmented symbols and non-symbols, coding said segmented symbols and non-symbols to form representative digital codes and combining said digital codes into a digital compressed data stream.

2. The method of claim 1 wherein said segmenting step includes optical symbol recognition in which pixel patterns representing said symbols are recognized and separated from said non-symbols.

3. The method of claim 1 wherein said segmenting step includes matching said symbols with stored symbols.

4. The method of claim 1 wherein said segmenting step includes isolation of a pattern of black and white pixels by connection of contiguous white pixels around the pattern of black pixels and white pixels.

5. In a facsimile coding system, the method comprising the steps of dynamically segmenting an uncompressed data stream having pixels representing symbols and non-symbols on a document into spatially segmented symbols and non-symbols by removing all symbols from the document at their location thereby leaving a residue of non-symbols, encoding said segmented symbols and said residue to form symbol and residue codes and combining said symbol and residue codes into a compressed digital data stream.

6. In a facsimile decoding system, the method comprising the steps of receiving a digital compressed data stream including data representing encoded spatially segmented symbol and non-symbol codes, separating said symbol and non-symbol codes, decoding said symbol code thereby forming first raster data, decoding said non-symbol code thereby forming second raster data, and combining said first and second raster data into an uncompressed raster data stream representing symbols and non-symbols on a document.

7. In a facsimile coding system, the method comprising the steps of dynamically segmenting an uncompressed data stream having pixels representing symbols and non-symbols on a document into spatially segmented symbols and non-symbols by removing all symbols from the document at their location thereby leaving a residue of non-symbols, encoding said segmented symbols and said residue to form symbol and residue codes, combining said symbol and residue codes into a compressed digital data stream, transmitting said compressed data stream from a first location to a second location, receiving said digital compressed data stream, separating said symbol and residue codes, decoding said symbol codes thereby forming first raster data, decoding said residue codes thereby forming second raster data, combining first and second raster data into a raster data stream representing said symbols and non-symbols on said document.

8. In a facsimile coding system, the method comprising the steps of scanning raster data having a plurality of black and white pixels representing an image for a first black pixel having white pixels disposed immediately preceding and above said first black pixel, blocking a group of black pixels contiguous to said first black pixel thereby forming a trial block, determining whether a symbol is isolated within said trial block, transferring said trial block to a residue if no symbol is isolated within said trial block and encoding same, comparing an isolated symbol block with stored symbols to determine a match, forming identification codes representing matched symbols, storing unmatched symbols, generating a pixel contents code representing said unmatched symbols, and combining said encoded data, said identification codes and said contents code into a digital bit stream.

9. In a facsimile coding system, the method comprising the steps of segmenting a digital uncompressed raster stream representing symbols and non-symbols into spatially segmented symbols and non-symbols by removing all symbols from the document at their location thereby leaving a residue of non-symbols, matching said segmented symbols with stored symbols, generating identification codes representing sufficiently matched segmented symbols, forming the exclusive-OR of said matched segmented symbols with said matched stored symbols, combining said residue and said exclusive-OR, encoding said combined residue and exclusive-OR to form representative digital codes, and combining said identification codes and said digital codes into a compressed digital data stream.

10. The method of claim 9 further including the steps of transmitting the compressed encoded data from a first location to a second location, receiving the transmitted compressed data stream, separating said identification codes from said digital codes, decoding said identification codes to form first raster data, decoding said digital codes to form second raster data, and combining said first and second raster data by an exclusive-OR operation thereby forming an uncompressed raster data stream representing said symbols and non-symbols on said document.

11. In a facsimile coding system, the method comprising the steps of forming a digital raster data stream having black and white pixels representing symbols and non-symbols on a document, dynamically segmenting the data stream into spatially segmented symbols and non-symbols, encoding the segmented non-symbols thereby forming first digital codes representing said segmented non-symbols, matching said segmented symbols with stored symbols, generating identification codes representing matched symbols, storing unmatched segmented symbols, generating second digital codes representative of said unmatched segmented symbols, and combining said first and second digital codes and said identification codes into a compressed digital data stream representing said document.

12. The method of claim 11 including the steps of scanning said raster data stream for the first black pixel having white pixels disposed immediately preceding and above said first black pixel, blocking a group of black pixels contiguous to said first black pixel thereby forming a trial block, and determining whether a symbol-like block is contained within said trial block.

13. The method of claim 12 including the step of determining the height, width and blackcount of said trial blocks.

14. The method of claim 13 including the step of determining the averages of the horizontal and vertical first and last run-lengths, and determining the number of transitions between black and white pixels in both said vertical and horizontal directions.

15. The method of claim 14 including the steps of calculating the feature space distance between the symbol-like block and each stored symbol, and selecting a stored symbol having the smallest feature space distance as the best prospect for a match.

16. The method of claim 15 further including the step of selecting a stored symbol having the next smallest distance as next best prospect for a match.

17. The method of claim 11 including the steps of storing a predetermined number of symbols, and replacing the least used symbol with a new symbol when said predetermined number of symbols are stored.

18. A facsimile coding system comprising means for segmenting an uncompressed digital raster data stream having pixels representing symbols and non-symbols on a document into spatially segmented symbols and non-symbols, encoding said segmented symbols and non-symbols to form representative digital codes, and means for combining said digital codes into a digital compressed data stream.

19. The system of claim 18 wherein said means for segmenting includes optical symbol recognition means for recognizing and separating pixel patterns representing said symbols from said non-symbols.

20. The system of claim 18 wherein said means for segmenting includes means for matching said symbols with stored symbols.

21. The system of claim 18 wherein said means for segmenting includes means for isolating a pattern of black and white pixels by connection of contiguous white pixels around the pattern of black pixels and white pixels.

22. A facsimile coding system comprising means for dynamically segmenting an uncompressed data stream having pixels representing symbols and non-symbols on a document into spatially segmented symbols and non-symbols by removing all symbols from the document at their location thereby leaving a residue of non-symbols, means for encoding said segmented symbols and said residue to form symbol and residue codes and means for combining said symbol and residue codes into a compressed digital data stream.

23. A facsimile decoding system comprising means for receiving a digital compressed data stream including data representing encoded spatially segmented symbol and non-symbol codes, means for separating said symbol and non-symbol codes, means for decoding said symbol codes thereby forming first raster data means for decoding said non-symbol codes thereby forming second raster data, and means for combining said first and second raster data into an uncompressed raster data stream representing said symbols and non-symbols on a document.

24. A facsimile coding system comprising means for dynamically segmenting an uncompressed data stream having pixels representing symbols and non-symbols on a document into spatially segmented symbols and non-symbols by removing all symbols from the document at their location thereby leaving a residue of non-symbols, means for encoding said segmented symbols and said residue to form symbol and residue codes, means for combining said symbol and residue codes into a compressed digital data stream, means for transmitting said compressed data stream from a first location to a second location, means for receiving said transmitted compressed data stream, means for separating said symbols and residue codes, means for decoding said symbol codes thereby forming first raster data, means for decoding said residue codes thereby forming second raster data, and means for combining said first and second raster data into a raster data stream representing said symbols and non-symbols on said document.

25. A facsimile coding system comprising means for scanning raster data having a plurality of black and white pixels representing an image for a first black pixel having white pixels disposed immediately preceding and above said first black pixel, means for blocking a group of black pixels contiguous to said first black pixel thereby forming a trial block, means for determining whether a symbol is isolated within said trial block, means for transferring said trial block to residue coding means if no symbol is isolated within said trial block and encoding same, means for comparing an isolated symbol block with stored symbols to determine a match, means for forming identification codes representing matched symbols, means for storing unmatched symbols, means for generating a pixel contents code representing said unmatched symbols, and means for combining said encoded data, said identification codes and said contents code into a digital bit stream.

26. A facsimile coding system comprising means for segmenting a digital uncompressed raster data stream representing symbols and non-symbols into spatially segmented symbols and non-symbols by removing all symbols from the document at their location thereby leaving a residue of non-symbols, means for matching said segmented symbols with stored symbols, means for generating identification codes representing sufficiently matched segmented symbols, means for forming an exclusive-OR signal representing the difference between said matched segmented symbols with said matched stored symbols, means for combining said residue and said exclusive-OR signal, means for encoding said combined residue and exclusive-OR signal to form representative digital codes, and means for combining said identification codes and said digital codes into a compressed digital data stream.

27. The system of claim 26 further including means for transmitting the compressed data stream from a first location to a second location, means for receiving the transmitted compressed data stream, means for separating said identification codes from said digital codes, means for decoding said identification codes to form first raster data, means for decoding said digital codes to form second raster data, and means for combining by an exclusive-OR operation said first and second raster data thereby forming an uncompressed raster data stream representing said symbols and non-symbols on said document.

28. A facsimile coding system comprising means for forming a digital raster data stream having black and white pixels representing symbols and non-symbols on a document, means for dynamically segmenting the data stream into spatially segmented symbols and non-symbols, means for encoding the segmented non-symbols thereby forming first digital codes, means for matching said segmented symbols with stored symbols, means for generating identification codes representing matched symbols, means for storing unmatched segmented symbols, means for generating second digital codes representing said unmatched segmented symbols, and means for combining said first and second codes and said identification codes to form a compressed digital data stream representing said document.

29. The system of claim 28 including means for scanning said raster data stream for the first black pixel having white pixels disposed immediately preceding and above said first black pixel, means for blocking a group of black pixels contiguous to said first black pixel thereby forming a trial block, and means for determining whether a symbol-like block is contained within said trial block.

30. The system of claim 29 including means for determining the height, width and blackcount of said trial blocks.

31. The system of claim 30 including means for determining the averages of the horizontal and vertical first and last run-lengths, and means for determining the number of transitions between black and white pixels in both said vertical and horizontal directions.

32. The system of claim 31 including means for calculating the feature space distance between the symbol-like block and each stored symbol, and means for selecting a stored symbol having the smallest feature space distance as the best prospect for a match.

33. The system of claim 32 further including means for selecting a stored symbol having the next smallest distance as next best prospect for a match.

34. The system of claim 28 including means for storing a predetermined number of symbols in said storage means, and means for replacing the least used symbol with a new symbol when said storage means is filled.

* * * * *